(12) United States Patent
Patel et al.

(10) Patent No.: US 10,601,599 B2
(45) Date of Patent: Mar. 24, 2020

(54) VOICE COMMAND PROCESSING IN LOW POWER DEVICES

(71) Applicant: SYNAPTICS INCORPORATED, San Jose, CA (US)

(72) Inventors: Manish J. Patel, Irvine, CA (US); Stanton Renna, Irvine, CA (US); Vamshi Duligunti, Irvine, CA (US); Johnny Wang, Sichuan Sheng (CN); Huanqi Chen, Sichuan Sheng (CN)

(73) Assignee: SYNAPTICS INCORPORATED, San Jose, CA (US)

(*) Notice: Subject to any disclaimer, the term of this patent is extended or adjusted under 35 U.S.C. 154(b) by 220 days.

(21) Appl. No.: 15/859,242

(22) Filed: Dec. 29, 2017

(65) Prior Publication Data

US 2019/0207777 A1 Jul. 4, 2019

(51) Int. Cl.
*G10L 15/22* (2006.01)
*H04L 12/12* (2006.01)
*H04L 12/861* (2013.01)
*G10L 15/08* (2006.01)

(52) U.S. Cl.
CPC .............. *H04L 12/12* (2013.01); *G10L 15/08* (2013.01); *G10L 15/22* (2013.01); *H04L 49/90* (2013.01); *G10L 2015/088* (2013.01); *G10L 2015/223* (2013.01)

(58) Field of Classification Search
CPC combination set(s) only.
See application file for complete search history.

(56) References Cited

U.S. PATENT DOCUMENTS

| 4,837,830 | A  | * | 6/1989  | Wrench, Jr. ............. G10L 17/00 704/238 |
| 2007/0168817 | A1 | * | 7/2007  | Viens ............... G01R 31/31932 714/742 |
| 2012/0253491 | A1 | * | 10/2012 | Miyata ............. G11B 20/10527 700/94 |
| 2014/0222436 | A1 |   | 8/2014  | Binder et al. |
| 2015/0127335 | A1 |   | 5/2015  | Ubale |
| 2015/0255070 | A1 |   | 9/2015  | Schuckle et al. |
| 2016/0322045 | A1 |   | 2/2016  | Redmann |
| 2016/0044160 | A1 |   | 11/2016 | Hatfield et al. |
| 2017/0242806 | A1 | * | 8/2017  | Solbach .................. G06F 3/061 |
| 2018/0061396 | A1 | * | 3/2018  | Srinivasan ............ G10L 15/005 |

OTHER PUBLICATIONS

PCT Search Report and Written Opinion, PCT Patent Application No. PCT/US2018/068016, dated Apr. 17, 2019, 12 pages.

* cited by examiner

*Primary Examiner* — Abul K Azad
(74) *Attorney, Agent, or Firm* — Haynes and Boone, LLP

(57) ABSTRACT

An audio processing device comprises audio input circuitry operable to receive audio input signals and to process the audio input signals to generate audio samples at a first rate. The audio processing device further comprises a first trigger engine operable to detect a keyword within the audio samples. Also, the audio processing device comprises a delay buffer operable to continuously receive and store the audio samples. The delay buffer is further operable to transfer the audio samples that are stored within the delay buffer to a host across a data bus at a second rate, which is faster than the first rate. Further, the delay buffer is operable to transfer the audio samples that are stored within the delay buffer to the host at the first rate, after the stored audio samples are transmitted.

18 Claims, 4 Drawing Sheets

VOICE COMMAND PROCESSING IN LOW POWER DEVICES

TECHNICAL FIELD

The present disclosure, in accordance with one or more embodiments, relates generally to audio signal processing, and more particularly for example, to voice command processing in low power devices.

BACKGROUND

Voice-controlled devices, such as smart speakers, have gained popularity in recent years. These devices typically receive audio through one or more microphones, and then process the received audio input to detect human speech, which may include one or more keywords and voice commands. To save power, many voice-controlled devices enter a sleep mode when inactive and wake up after a keyword is detected in the audio input to enable further audio input and voice command processing. After the wake up sequence is complete, the device may process the received audio input stream in real time. In some devices, voice commands received prior to the completion of the wake up sequence may be lost, requiring the speaker to repeat the voice command. In other devices, a processing delay may be introduced which may lead to the user slowing down or otherwise altering speech patterns so that the initial voice command may be received. There is therefore a continued need for improved systems and methods for processing voice commands in low power devices.

SUMMARY

An audio processing device comprises audio input circuitry operable to receive audio input signals and process the audio input signals to generate audio samples. The audio processing device further comprises a first trigger engine operable to detect a keyword within the audio samples, and a delay buffer operable to continuously receive and store the generated audio samples. The first trigger engine is further operable to transmit a wake up signal to a host device after detecting the keyword. The delay buffer is further operable, in response to a request from the host device, transmit the stored audio samples to the host device across a high speed bus at a rate faster than a real time rate until the transmission reaches the next generated audio sample.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Figure 1:
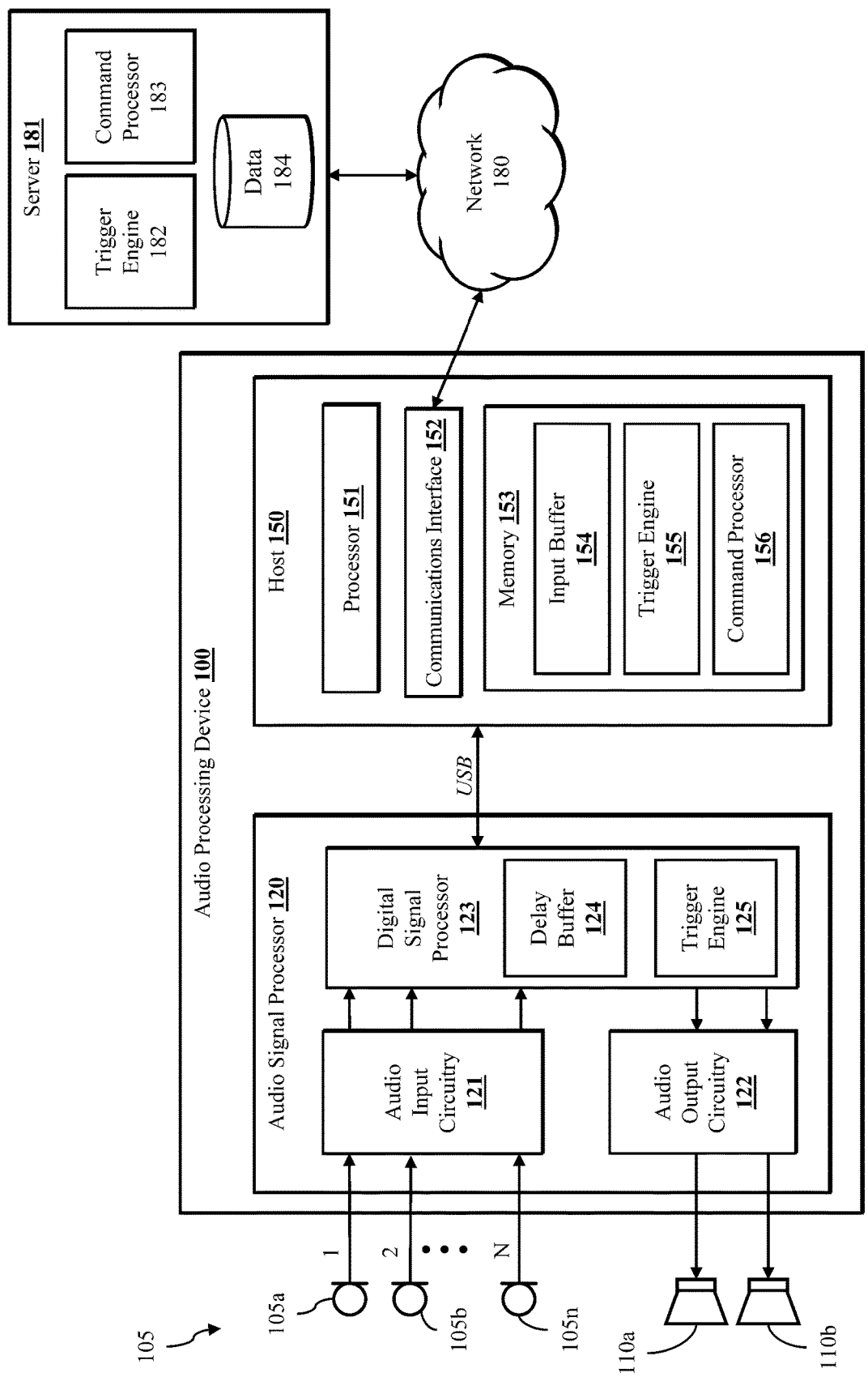
FIG. 1 is a diagram illustrating an example audio processing system, in accordance with one or more embodiments.

The methods and apparatus of the present invention provide improved techniques for processing audio samples in low power voice-controlled devices. In various embodiments, audio received during a sleep mode, low-power mode or wake up sequence is processed with low latency by a host device.

During operation, devices controlled by speech are often waiting for a keyword to be spoken to trigger further voice command processing. To save power, some devices include a host processor that is placed in a sleep mode during periods of inactivity, while the audio input is routed to a low power Digital Signal Processor (DSP). The low power DSP receives the audio input and runs a lower power trigger engine to detect the keyword. After a keyword is detected, the DSP transmits a wake up signal to the high power host processor. In various embodiments, the host system may include a high performance trigger engine that revalidates the keyword to ensure the keyword has been detected, a high performance voice command processor for detecting and executing voice commands that follow the keyword, and/or a communications interface for communicating with other devices which may provide additional voice command processor functions, such as a cloud server.

In various embodiments, the low power DSP stores audio samples in a delay buffer when the host is in sleep mode. After waking up the host processor, the DSP sends the stored audio samples to the host processor across a data bus followed by a stream of audio input samples to support seamless transition between the keyword and the command processing. In one embodiment, the delay buffer may be implemented as a circular delay buffer of size greater than or equal to "T seconds" provided in the DSP, where T represents the delay between the keyword detection, host processor wake up sequence and start of the transmission of stored audio samples to the host processor. Thus, when the host wakes up, the audio data stored in the DSP's circular delay buffer is transferred to the host as well as the real-time audio data being captured after wake up.

After the host wakes up and the DSP starts to send audio samples from the circular delay-buffer, the currently processed audio samples are stored in the circular delay buffer behind T seconds of stored audio samples. If the audio samples are processed serially in real time, latency would be added into the system, such that if the user were to say the keyword and the command, the response to this command would then be delayed by T seconds. One solution is to transfer the audio data stored in the circular delay buffer and the current real-time data in separate channels/audio streams to the host. In this approach, however, two streams of data are sent to the host, which may require stitching of the audio from the two streams in the host, which may introduce synchronization issues which can cause pops and clicks in the recorded audio.

In various embodiments of the present disclosure, audio samples received from an audio stream are stored in the circular buffer. When the transfer of stored audio data from the circular buffer to the host processor starts, the stored and currently processed audio samples are sent over the same audio stream (such as through a USB interface). In one embodiment, the stored audio samples are transferred from the circular buffer at a high rate, which is faster than the real time audio input. Thus, a larger amount of audio samples is initially transferred until the circular buffer is storing real-time audio data. In one embodiment, this approach is used to enable a low-power two-stage trigger implementation, with one trigger running on a low power audio DSP and a second trigger running on a higher powered host processor (or remotely, for example, on a cloud server) with integration on the host side.

In one embodiment, audio data samples are transferred between the DSP and host processor using the USB protocol. In the USB audio protocol, the amount of audio data that the DSP can send to the host processor may be requested by the host. For example, if bit 7 of bmAttributes of Class-Specific AS Isochronous Audio Data Endpoint Descriptor is set, it indicates that host should use maximum packet size as request size. One way to send data at a faster than normal rate is to maximize the requested packet size (e.g., 1016 bytes). When the circular delay buffer is close to emptied, the DSP will start sending audio samples at regular, real-time, rate. In alternate embodiments, the system and process described herein may use an alternative data transmission protocol.

Referring to FIG. 1, an example audio processing system, in accordance with one or more embodiments, will be described. As illustrated, an audio processing device 100 includes an audio sensor array 105, an audio signal processor 120, and a host system 150. The audio processing device 100 is a voice-controlled device (e.g., smart speakers) that processes voice commands using a two-stage keyword detection scheme. In one embodiment, this scheme utilizes a low power trigger engine in the audio signal processor 120 to perform an initial course detection of keywords, and a high-power trigger engine implemented on the host system 150 (or implemented on another device) to perform a more precise detection of keywords. While the low-power trigger engine is processing the received audio, the high-power trigger engine is in sleep mode to conserve power. After the low-power trigger engine detects a keyword within the received audio, the received audio is transferred to the high-power trigger engine, which is awakened from sleep mode, to process the audio to validate whether the audio did indeed include a keyword.

The audio sensor array 105 comprises one or more sensors, each of which may be implemented as a transducer that converts audio inputs in the form of sound waves into an audio signal. In the illustrate environment, the audio sensor array 105 comprises a plurality of microphones 105a-105n, each generating an audio input signal which is provided to the audio input circuitry 121 of the audio signal processor 120. The sensor array 105 generates a multichannel audio signal, with each channel corresponding to an audio input signal from one of the microphones 105a-105n.

The audio signal processor 120 includes the audio input circuitry 121, a digital signal processor (DSP) 123, and optional audio output circuitry 122. In various embodiments, the audio signal processor 120 may be implemented as an integrated circuit comprising analog circuitry, digital circuitry, and a digital signal processor operable to execute logic stored in firmware. The audio input circuitry 121, for example, may include an interface to the audio sensor array 105, anti-aliasing filters, analog-to-digital converter circuitry, echo cancellation circuitry, and other audio processing circuitry and components as disclosed herein.

The digital signal processor 123 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. For example, the digital signal processor 123 may include a digital signal processing module, which may represent any suitable combination of hardware components and software instructions, configured to perform various operations as further discussed herein.

The digital signal processor 123 is operable to process the audio input signals (e.g., audio samples), which are obtained by the audio sensor array 105. In various embodiments, a trigger engine (e.g., a low-power trigger engine) 125 is operable to receive audio samples from the audio input circuitry 121 and to detect one or more keywords (e.g., words that trigger specific commands) in the received audio samples. The trigger engine 125 is configured for operation in a low power device to perform a course detection of the keywords in the audio samples. For example, a low power trigger engine may be configured to trigger with a high probability of identifying the presence of a trigger word, but without the robustness to avoid false detection. After the initial detection by the trigger engine 125 of a keyword in a set of audio samples, a higher power trigger engine 155, which runs a more robust keyword detection algorithm than the trigger engine 125, will review the identified set of audio samples to perform a more precise detection of keywords to determine whether the set of audio samples does indeed comprise a keyword.

A delay buffer 124 is operable to receive and to store audio samples from the audio input circuitry 121. In one or more embodiments, the delay buffer 124 is operable to store at least "T seconds" of the audio samples, where T is the amount of time it takes the trigger engine 125 to detect the keyword plus the amount of time it takes to wake up the host 150 and for the host 150 to start receiving stored audio samples. The delay buffer 124 operates as a first-in, first-out (FIFO) device, such that once the delay buffer 124 has reached its maximum capacity for storage of the audio samples, the delay buffer 124 will discard the oldest audio sample stored within the delay buffer 124 and store the next audio sample received from the audio input circuitry 121.

After the trigger engine 125 detects a keyword in the audio samples, the DSP 123 transmits a wake up signal to the host 150 across a communications bus, such as a universal serial bus (USB) or a general-purpose input/output (GPIO) line. The host 150 then executes a wake up sequence and requests the audio samples stored in the delay buffer 125. The delay buffer 124 is operable to transfer the stored audio samples to the host 150 across the bus to the host for further trigger and voice command processing. In one embodiment, the delay buffer is implemented as a circular buffer having a read pointer and a write pointer. Initially, a read pointer in the delay buffer 124 is initialized at the location of the first audio sample. At the beginning of the transfer of audio samples from the delay buffer 124, the audio samples in the delay buffer 124 starting from the read pointer are transmitted through the bus at a faster than real time rate. For example, the audio samples may be transmitted at substantially the maximum available transmission rate available on the bus. During transmission of stored audio samples to the host, input audio samples continue to be stored at the location of the write pointer. The distance between the read pointer and the write pointer in the delay buffer 124 will eventually become small as the data buffer 124 is emptied. When stored audio samples are no longer available for transmission at the faster rate, the input data stream will continue to be sent through the delay buffer to the host in real time.

The optional audio output circuitry 122 processes audio signals received from the digital signal processor 123 for output to at least one speaker, such as speakers 110a and 110b. In various embodiments, the audio output circuitry 122 may include a digital-to-analog converter (DAC) that converts one or more digital audio signals to analog, and an amplifier for driving the speakers 110a and 110b.

The audio processing device 100 may be implemented as any device operable to receive and respond to audio data, such as, for example, a mobile phone, smart speaker, tablet, laptop computer, desktop computer, voice controlled appliance, or automobile. The host 150 may comprise various hardware and software components for operating the audio processing device 100. In the illustrated embodiment, the host 150 includes a processor 151, a communications interface 152 for communicating with networks, such as network 180 (e.g., the Internet, a local area network, or a cellular network), and a memory 153.

The processor 151 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. For example, the processor 151 may include a digital signal processing module, which may represent any suitable combination of hardware components and software instructions, configured to perform various operations as further discussed herein. The processor 151 is configured to interface and communicate with the audio signal processor 120.

It will be appreciated that although the audio signal processor 120 and the host 150 are shown as incorporating hardware components and circuitry, in some embodiments, at least some or all of the functionalities that these hardware components and circuitries are operable to perform may be implemented as software modules being executed by the processor 151 and/or digital signal processor 123 in response to software instructions and/or configuration data, stored in the memory 153 or firmware of the digital signal processor 123.

The memory 153 may be implemented as one or more memory devices configured to store data and information, including audio data and program instructions. Memory 153 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory.

The processor 151 may be configured to execute software instructions stored in the memory 153. In various embodiments, an input buffer 154 is operable to receive and store audio samples from the audio signal processor 120. A trigger engine (e.g., a high-power trigger engine) 155 is operable to perform keyword detection in the input audio stream (i.e. to validate keywords detected by the low power trigger engine 125) stored in the input buffer 154. As illustrated, the trigger engine 155 is a more robust trigger engine than trigger engine 125 and, as such, may operate with greater processing power and memory requirements for more precise keyword and false trigger detection. A command processor 156 is operable to detect, and execute commands that follow validated keywords. In various embodiments, the command processor 156 may receive the audio samples for voice command processing without the trigger validation performed by the trigger engine 155.

The communications interface 152 facilitates communication of data between the audio processing device 100 and a remote server 181. For example, the communications interface 152 may enable Wi-Fi (e.g., 802.11) or Bluetooth connections between the audio processing device 100 and one or more a wireless routers providing network access to a remote server 181, such as through a network 180 (e.g., the Internet or the cloud). In various embodiments, the communications interface 152 may include other wired and wireless communications components facilitating direct or indirect communications between the audio processing device 100 and one or more remote servers 181.

A remote server 181 may optionally be used to validate keywords and to detect and execute commands found in the audio samples stored in the input buffer 154. In various embodiments, the remote server 181 may include a trigger engine (e.g., a high power trigger engine) 182 to validate keywords in the audio samples, a command processor 183 to detect and execute commands following validated keywords, and a database 184 to store data required for the processing.

During operation, the host 150 enters a sleep mode when in an inactive state to conserve power. The microphones 105a-105n of the audio sensor array 105 receive audio input from the environment. The audio sensor array 105 converts the sound waves into a multichannel audio input signal, which is provided to the audio input circuitry 120 of the audio signal processor 120. The audio input circuitry 120 processes the audio input signal (e.g., by enhancing the audio input signal by removing environment noise) to produce audio samples. The audio samples are provided to the delay buffer 124 and to the trigger engine 125 of the digital signal processor 123. In one embodiment, only one channel of the multichannel audio signal is provided to the trigger engine 125 and delay buffer 124 for further processing.

The delay buffer 124 continuously stores the audio samples in real time on a FIFO basis. While the delay buffer 124 is storing the audio samples, the trigger engine 125 analyzes the received audio samples to detect the presence of at least one predetermined keyword. After the trigger engine 125 detects a keyword, the digital signal processor 123 sends a wake up command to the host 150 to wake the host 150 from sleep mode. In one or more embodiments, communications between the digital signal processor 123 and the host 150 are transmitted by using a USB protocol, or other data transmission protocol. In at least one embodiment, the wake up command may be sent to the host 150 over a different communication channel (e.g., a second bus) than the communication channel used to transfer the audio samples. After the host 150 receives the wake up command, the host 150 executes a wake up sequence to wake up from the sleep mode and transition to operational mode. The host 150 may then respond by sending a request for the audio samples to the digital signal processor 123.

In response, the delay buffer 124 transfers the stored audio samples to the host 150. In one embodiment, the audio samples stored in the delay buffer 124 are transmitted at the maximum rate available under the communications bus until the delay buffer 124 is empty, after which time the audio samples are transmitted from the delay buffer 124 over the same audio stream at a real time rate.

The input buffer 154 receives and stores the transmitted audio samples in a first in, first out basis. In one embodiment, the trigger engine 155 analyzes the audio samples to validate the presence of the trigger word. Alternatively the audio samples may be transmitted to a trigger engine 182 located in a remote server 181. The trigger engine 155 or 182 receives the audio samples and validates the presence of a keyword in the received audio samples. After the keyword has been validated, the audio samples following the keyword are transferred to a command processor 156 for detecting and executing one or more voice commands. In one or more embodiments, the trigger engine 155 and/or 182 may alternatively or additionally transfer the audio samples to a command processor 183 located on a remote server 181.

The command processor 156 and/or 183 analyzes the audio samples for natural language to determine the command following the keyword. After the command processor 156 and/or 183 determines the command, the host 150 (or server 181) executes the command (e.g., by sending an audio response that is outputted by speakers 110a and 110b). After a period of time without activity, the host 150 may sends a stop command to the digital signal processor 123 to stop transferring the audio samples from the delay buffer 124 to the input buffer 154. After the host 150 sends the stop command, the host 150 may enter a sleep mode. After the digital signal processor 123 receives the stop command from the host 150, the digital signal processor 123 stops transferring audio samples to the host 150 and continues to store input audio samples in the delay buffer 124 and detects one or more keywords using the low power trigger engine 125.

Figure 2:
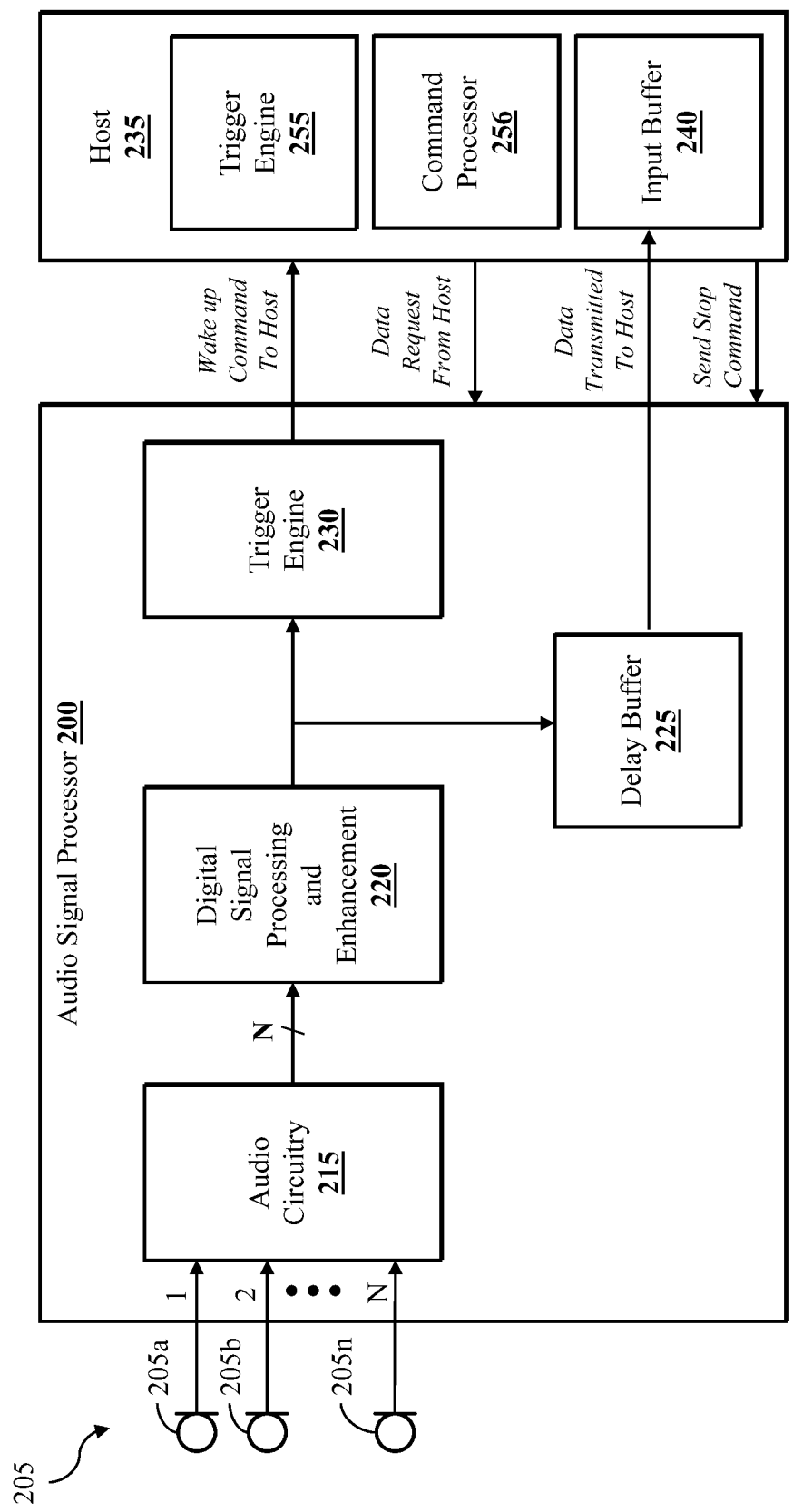
FIG. 2 is a diagram illustrating an example audio signal processor and host, in accordance with one or more embodiments.

FIG. 2 is a diagram illustrating an audio signal processor 200 and host 235, in accordance with one or more embodiments. The audio signal processor 200 is embodied as one or more integrated circuits including analog and digital circuitry and logic implemented by a digital signal processor, such as the audio signal processor 120 of FIG. 1. As illustrated, the audio signal processor 200 includes audio circuitry 215, a digital signal processing and enhancement component 220, a delay buffer 225, and a trigger engine 230. In one or more embodiments, the delay buffer 225 may be a circular delay buffer.

The host 235 may be embodied as one or more integrated circuits including analog and digital circuitry and logic implemented by a digital signal processor, such as host 150 of FIG. 1. As illustrated, the host 235 includes a trigger engine 255, a command processor 256, and an input buffer 240. The trigger engine 255 may be a higher power, more robust trigger engine than trigger engine 230, allowing for more precise detection of keywords.

The audio signal processor 200 receives a multichannel audio input from at least one audio sensor, such as microphone array 205 comprising at least one sensor 205a-205n. The audio sensors 205a-205n may be microphones that are implemented with an audio processing device, such as the audio signal processor 120 of FIG. 1. The audio signals may be processed initially by the audio input circuitry 215, which may include anti-aliasing filters, an analog to digital converter, and/or other audio input circuitry. The audio input circuitry 215 outputs a digital, multichannel audio signal having N channels, where N is the number of microphone inputs. The multichannel audio signal is passed to the digital signal processing and enhancement component 220, which processes the multichannel audio signal by removing environment noise to enhance the signal, and by optionally cancelling echo components within the audio signal to produce at least one channel that isolates the speech signal (e.g., by using beamforming techniques, blind source separation, or other audio enhancement techniques). The enhanced audio signal is then provided to the delay buffer 225 and the trigger engine 230. The delay buffer 225 is operable to continuously store samples of the enhanced audio signal on a first in, first out basis. The trigger engine 230 is operable to receive the enhanced audio signal from the digital signal processing and enhancement component 220 and is operable to detect at least one keyword within the audio signal. In one or more embodiments, the trigger engine 230 searches for the beginning and end of words within the audio signal and analyzes the corresponding audio signal against at least one keyword stored within a memory.

When the trigger engine 230 detects a keyword, the trigger engine sends a wake up command to the host 235 to wake the host 235 from a low power sleep mode. After the host 235 receives the wake up command, the host 235 executes a wake up sequence to wake up from the sleep mode, transition to an operational mode, and respond by sending a request for audio samples to the audio signal processor 200. In response, the audio signal processor 200 transfers the stored audio samples from the delay buffer 225 to the input buffer 240. In one embodiment, the stored audio samples are transmitted at a maximum available transmission speed in accordance with a protocol of a bus connecting the audio signal processor 200 and the host 235. After the stored audio samples are transferred to the host, the delay buffer 225 continues to receive audio samples from the digital signal processing and enhancement component 220 and transfer to the host 235 continues at a real time rate.

In one embodiment, the audio samples stored in the input buffer 240 are provided to the trigger engine 255 to validate the presence of a keyword. After the trigger engine 255 receives the audio samples, the trigger engine 255 detects the presence of a keyword using a more robust trigger engine 255 to validate the presence of the keyword. After a keyword is detected, the audio samples following the validated keyword (which may contain a verbal command) are provided to the voice command processor 256.

The voice command processor 256 identifies speech in the audio samples (e.g., using a natural language algorithm) to detect a voice command following the validated keyword. After the command processor 256 determines the command, the host 235 may execute the command. In various embodiments, the commands may be processed by executing a system command, searching for and delivering media, sending an audio response that is outputted by speakers (e.g., refer to 110a and 110b in FIG. 1), searching the Internet for an answer to a user inquiry or executing other commands in accordance with system requirements. After a period of inactivity, the host 235 may send a stop command to the audio signal processor 200 to stop transferring the audio samples from the delay buffer 225 to the input buffer 240. After the host 235 sends the stop command, the host 235 may resume sleep mode. After the audio signal processor 200 receives the stop command from the host 235, the audio signal processor 200 stops transferring audio samples to the host 235.

Figure 3:
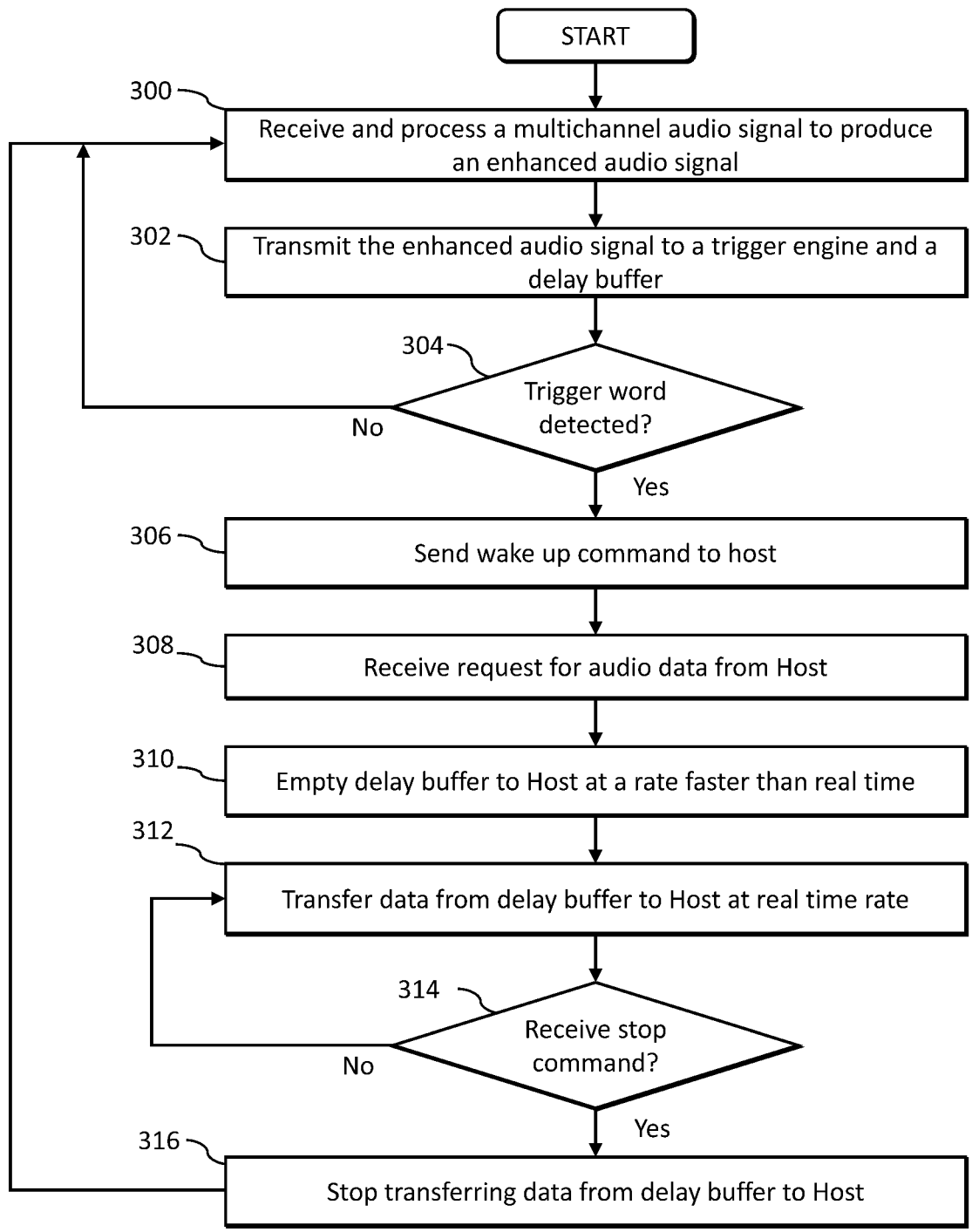
FIG. 3 is a flow chart illustrating an example operation of an audio signal processor, in accordance with one or more embodiments.

FIG. 3 is a flow chart illustrating an example operation of an audio signal processor, in accordance with one or more embodiments. In some embodiments, the method may be performed by one or more components in the audio signal processor 120 of the audio processing device 100 of FIG. 1. At the start of the method, the audio signal processor receives and processes a multichannel audio signal to produce an enhanced audio signal (e.g., audio samples) 300. Then, the audio signal processor transmits the enhanced audio signal (e.g., audio samples) to a trigger engine and to a delay buffer 302. Then, the audio signal processor determines whether a trigger word has been detected 304. If the audio signal processor determines that a trigger word has not been detected, then the method proceeds to step 300.

If the audio signal processor determines that a trigger word has been detected, then the audio signal processor sends a wake up command to the host in step 306. The audio signal processor receives a request for audio data from the host in step 308. The delay buffer of the audio signal processor is then emptied to the host at a faster than real time rate in step 310. Audio samples subsequently received by the delay buffer are transferred to the host at a real time rate in step 312. The audio signal processor determines whether a stop command has been received in step 314. If the audio signal processor determines that a stop command has not been received, then the method proceeds to step 312. However, if the audio signal processor determines that a stop command has been received, then the transfer of data from the delay buffer to the host is stopped in step 316. Then, the method proceeds to step 300 and is repeated.

Figure 4:
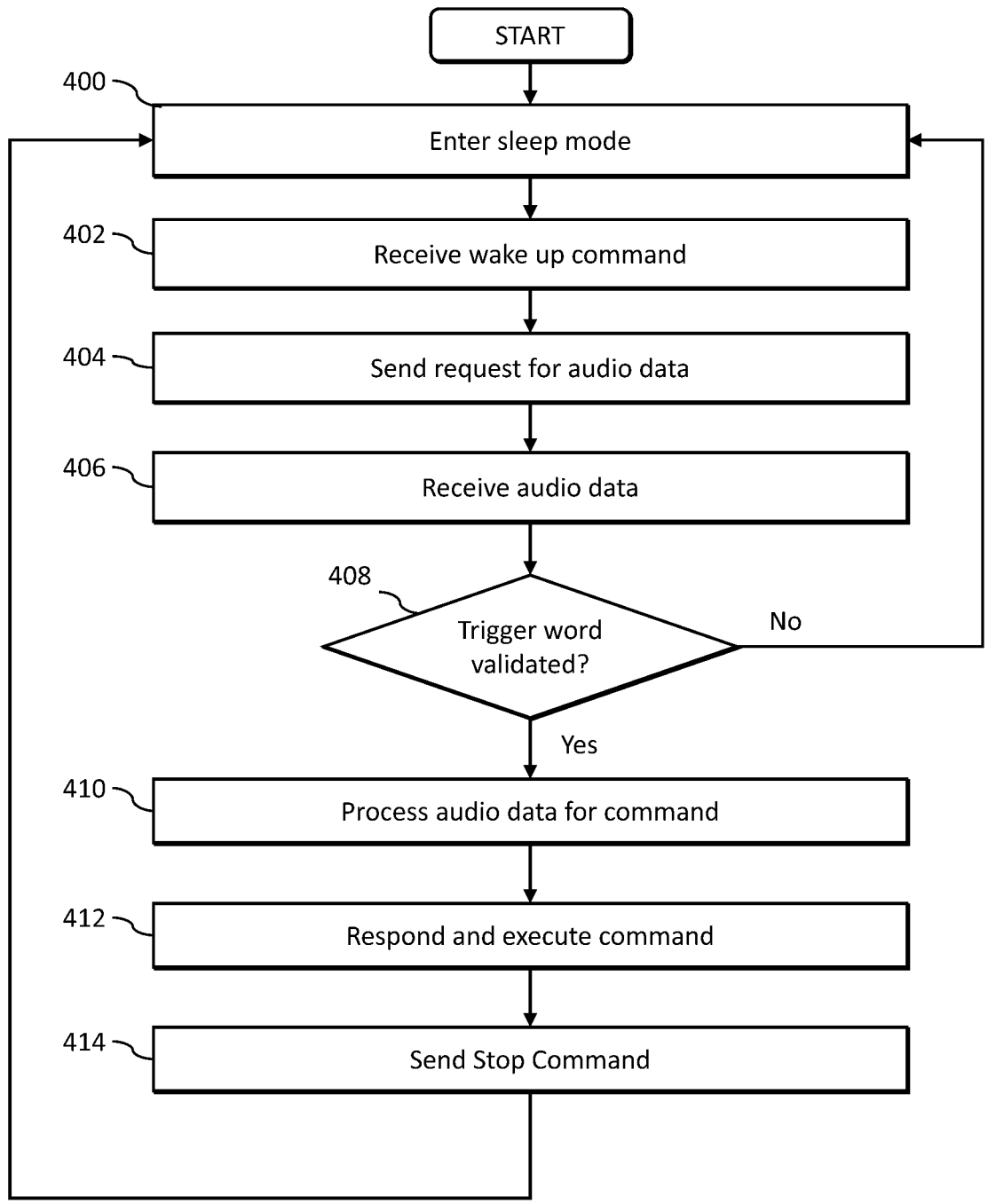
FIG. 4 is a flow chart illustrating an example operation of a host, in accordance with one or more embodiments.

FIG. 4 is a flow chart illustrating an example operation of a host, in accordance with one or more embodiments. In some embodiments, the method may be performed by one or more components in the host 150 of the audio processing device 100 of FIG. 1. At the start of the method, the host enters a sleep mode 400. The host receives a wake up command in step 402 from a low power processor and executes a wake up sequence. The host then sends a request for audio data in step 404. The host receives the audio data 406 from the low power processor and processes the input stream at a faster than real time rate until the host is reaches the current audio input stream. The host then validates the presence of a trigger word in the audio samples in step 408. If the host determines that a trigger word has not been validated, the method proceeds to step 400. However, if the host determines that the presence of a trigger word has been validated, the host processes the audio data for voice command 410. The host then executes the voice command and responds, as appropriate, to the user in step 412. After a period of inactivity, the host sends a stop command to the low power processor to stop the transmission of data in step 414. The method then proceeds to step 400.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for processing voice commands in a low power device comprising:
   processing an audio input signal to generate a stream of voice enhanced audio samples at a first rate;
   storing the voice enhanced audio samples in a delay buffer on a first-in, first-out basis;
   detecting, using a first trigger engine, a keyword in the voice enhanced audio samples;
   transmitting a wake up command to a host device to waken the host device from a sleep mode to an active move;
   receiving a data transfer request from a host device;
   transmitting the stored voice enhanced audio samples to an input buffer of the host device across a data bus at a second rate, wherein the second rate is greater than the first rate until a next voice enhanced audio sample is not stored in the delay buffer;
   transmitting the generated stream of voice enhanced audio samples to the input buffer of the host device at the first rate until a stop command is received from the host device;
   processing, by a voice command processor, the voice enhanced audio samples following the keyword to determine a command; and
   executing the determined command.

2. The method of claim 1, further comprising receiving the audio input signal from an audio sensor array, wherein the audio input signal is an audio signal.

3. The method of claim 1 wherein the delay buffer is configured to store voice enhanced audio samples representing T seconds of audio input data, wherein the T is a time period from receiving the audio input signal to the host device receiving first transmitted voice enhanced audio samples.

4. The method of claim 1, further comprising sending a wake up command to the host device after detecting the keyword in the voice enhanced audio samples.

5. The method of claim 4, further comprising:
   receiving, by the host device, the wake up command;
   transitioning, by the host device, from a sleep mode to an operating mode; and
   transmitting, from the host device, a request for audio samples.

6. The method of claim 5, further comprising receiving on the data bus the request for audio samples from the host device.

7. The method of claim 1, wherein the second rate is a maximum available transmission rate for the data bus.

8. The method of claim 1, further comprising:
   receiving, by the host device, the transmitted voice enhanced audio samples; and
   storing, by the host device, the voice enhanced audio samples in an input buffer.

9. The method of claim 8, further comprising:
validating, by a second trigger engine of the host device, a presence of the keyword in the voice enhanced audio samples stored in the input buffer.

10. The method of claim 1, further comprising:
detecting a period of inactivity of the host device;
sending, by a host device, the stop command; and
transitioning, by the host device, from an operational mode to a sleep mode.

11. An audio processing system for processing voice commands in a low power device comprising:
audio input circuitry operable to receive an audio input signal and generate a stream of voice enhanced audio samples having a first data rate;
a first trigger engine operable to detect a keyword in the stream of voice enhanced audio samples and transmit a wake up command to a host device across a data bus, wherein the host device is wakened from a sleep mode to an active mode;
a delay buffer operable to store the stream of voice enhanced audio samples on a first-in, first-out basis and, after receiving a data transfer request from the host device, transmit the stored voice enhanced audio samples to an input buffer of the host device at a second data rate that is greater than the first data rate until a next voice enhanced audio sample is not stored in the delay buffer;
wherein the delay buffer, after the stored voice enhanced audio samples are transmitted from the delay buffer to the input buffer of the host device, is operable to transmit the stream of voice enhanced audio samples to the input buffer of the host device at the first data rate until a stop command is received from the host device; and
wherein the host device further comprises a voice command processor operable to identify a voice command following the keyword in the voice enhanced audio samples stored in the input buffer and execute the identified voice command.

12. The audio processing system of claim 11, further comprising an audio sensor array operable to sense sound from an environment and generate the audio input signal.

13. The audio processing system of claim 11 wherein the delay buffer is a memory operable to store a subset of the stream of voice enhanced audio samples representing at least T seconds of the audio input signal, wherein T is a time period between receiving the stream of voice enhanced audio samples to the host device receiving the first stored voice enhanced audio samples.

14. The audio processing system of claim 11, wherein the first trigger engine is operable to send a wake up command to the host device after detecting the keyword in the stream of voice enhanced audio samples.

15. The audio processing system of claim 14, wherein the host device comprises:
a host processor operable to receive the wake up command from the data bus, execute a wake up sequence, transmit on the data bus a request for voice enhanced audio samples and receive the stored voice enhanced audio samples.

16. The audio processing system of claim 11, wherein the host device comprises an input buffer operable to store the voice enhanced audio samples received from the data bus.

17. The audio processing system of claim 16, wherein the host device further comprises a second trigger engine operable to detect a presence of the keyword in the voice enhanced audio samples stored in the input buffer.

18. The audio processing system of claim 11, wherein the host device is further operable to detect a period of inactivity, transmit a stop command across the data bus to stop transmission of the voice enhanced audio samples from the delay buffer, and transition to a sleep mode.

* * * * *